United States Patent
Pressley et al.

(10) Patent No.: US 7,803,858 B2
(45) Date of Patent: *Sep. 28, 2010

(54) ANTI-FLOCCULANT COATING COMPOSITION

(75) Inventors: Ozzie Moore Pressley, Cheltenham, PA (US); Wei Zhang, Maple Glen, PA (US)

(73) Assignee: Rohm and Haas Company, Philadelphia, PA (US)

(*) Notice: Subject to any disclaimer, the term of this patent is extended or adjusted under 35 U.S.C. 154(b) by 709 days.

This patent is subject to a terminal disclaimer.

(21) Appl. No.: 11/481,310

(22) Filed: Jul. 5, 2006

(65) Prior Publication Data

US 2007/0021536 A1 Jan. 25, 2007

Related U.S. Application Data

(60) Provisional application No. 60/700,525, filed on Jul. 19, 2005.

(51) Int. Cl.
*C08K 5/49* (2006.01)
*C08F 130/02* (2006.01)

(52) U.S. Cl. ................ 524/115; 524/425; 524/431; 524/706; 524/560

(58) Field of Classification Search ......... 524/115, 524/425, 431, 706, 560
See application file for complete search history.

(56) References Cited

U.S. PATENT DOCUMENTS

| 4,891,401 A | 1/1990 | Huybrechts et al. |
| 5,385,960 A * | 1/1995 | Emmons et al. ............. 523/205 |
| 6,492,451 B1 | 12/2002 | Dersch et al. |
| 6,794,436 B2 | 9/2004 | Schlarb et al. |
| 6,905,814 B1 * | 6/2005 | Aubay et al. ............... 502/309 |
| 2003/0088014 A1 * | 5/2003 | Edwards et al. ............. 524/523 |
| 2005/0009954 A1 * | 1/2005 | Gebhard et al. ............. 523/210 |
| 2007/0208129 A1 * | 9/2007 | Finegan et al. .............. 524/497 |

FOREIGN PATENT DOCUMENTS

| EP | 1582567 | 10/2005 |
| JP | 07257923 | 10/1995 |
| JP | 07257923 A * | 10/1995 |
| JP | 2003-277688 | 10/2003 |
| WO | WO 93/11181 | 10/2005 |

OTHER PUBLICATIONS

JP07257923A, Oct. 1995, Kuda et al., Machine translation.*
Handbook of fillers, 2$^{nd}$ Ed., George Wypych, 2000, Front page and p. 251.*

* cited by examiner

*Primary Examiner*—Satya B Sastri
(74) *Attorney, Agent, or Firm*—Kenneth Crimaldi

(57) ABSTRACT

An aqueous composition containing pigment and an acrylic polymer and having reduced flocculation of pigment particles.

7 Claims, No Drawings

ANTI-FLOCCULANT COATING COMPOSITION

This non-provisional patent application is claiming priority based on Provisional Patent Application No. 60/700,525, filed Jul. 19, 2005, the disclosure of which is incorporated herein by reference.

This invention relates to a method to control or prevent bridging flocculation of latexes in the presence of pigment or extenders.

Acrylic polymers having phosphorus-containing functional groups have been known for some time as pigment dispersants for aqueous coating compositions. Efficient dispersion of pigment particles increases the hiding ability of a coating. However, bridging flocculation of a coating composition comprising unimodal or bimodal aqueous emulsion binders with pigment particles (e.g., $TiO_2$ and/or extenders) can make formulation work very difficult. Among the solutions proposed for reducing flocculation is the addition of phosphoric acid or its salts, see, e.g., U.S. Pat. No. 5,385,960. However, this approach only slows the process of flocculation, and other formulations with reduced flocculation are needed.

The problem addressed by this invention is the need for additional acrylic coating formulations with reduced flocculation.

STATEMENT OF THE INVENTION

The present invention is directed to an aqueous composition comprising: (a) pigment particles; (b) particles of acrylic polymer containing phosphate or phosphonate groups; and (c) at least one compound containing a pyrophosphate linkage and having no more than 12% carbon.

DETAILED DESCRIPTION OF THE INVENTION

All percentages are weight percentages, unless specified otherwise. The term "acrylic polymer" refers to a polymer comprising at least 40% monomer units derived from among the following acrylic monomers: acrylonitrile (AN); acrylamide (AM), methacrylamide, and their N-substituted derivatives; acrylic acid (AA), methacrylic acid (MAA), and itaconic acid (IA) and their esters. The terms (meth)acrylic and (meth)acrylate refer to acrylic or methacrylic, and acrylate or methacrylate, respectively. Esters of AA and MAA include, but are not limited to, methyl methacrylate (MMA), ethyl methacrylate (EMA), butyl methacrylate (BMA), ethylhexyl methacrylate (EHMA), lauryl methacrylate (LMA), hydroxyethyl methacrylate (HEMA), methyl acrylate (MA), ethyl acrylate (EA), butyl acrylate (BA), ethylhexyl acrylate (EHA) and hydroxyethyl acrylate (HEA), as well as other esters of AA or MAA, e.g., alkyl, hydroxyalkyl and aminoalkyl esters; phosphoalkyl (meth)acrylates. Phosphoalkyl (meth)acrylates include, e.g, phosphoethyl methacrylate (PEM), phosphopropyl (meth)acrylate, phosphobutyl (meth)acrylate. Derivatives of acrylamide include, e.g., methylol acrylamide (MLAM). Acrylic polymers also may contain monomer units derived from other ethylenically unsaturated monomers, e.g., styrene or substituted styrenes; other α,β-unsaturated carboxylic acids, esters and amides; vinyl esters or halides; etc. Preferably, an acrylic polymer contains at least 50% monomer residues derived from acrylic monomers, more preferably at least 60%, and most preferably at least 70%; preferably an acrylic polymer is substantially free of monomer units other than those of AA, MAA and their esters. An "acrylic-styrene copolymer" is a polymer at least 50% of whose monomer units are derived from among AA, MAA, esters of AA and MAA, and styrene monomers. Styrene monomers include styrene (Sty) and substituted styrenes, e.g., α-methylstyrene (AMS). Preferably, acrylic-styrene copolymers contain less than 20% of monomer units other than styrene or acrylic monomer units, more preferably less than 10%, and most preferably less than 5%. Preferably, a polymer in this invention is present in the form of a latex. The polymer may be unimodal or bimodal, see, e.g., U.S. Pat. No. 6,818,697.

The aqueous composition of this invention comprises an acrylic polymer containing phosphate or phosphonate groups. In one embodiment of the invention, these groups are present in the form of monomer residues from phosphate- or phosphonate-containing monomers, including, e.g., phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate. For purposes of this invention, phosphoalkyl (meth)acrylates include ethylene oxide condensates of (meth)acrylates such as $H_2C\!=\!C(CH_3)COO(CH_2CH_2O)_nP(O)(OH)_2$, where n is from 1 to 50. The phosphate- or phosphonate-containing polymer may be the only acrylic polymer in the composition, or it may be blended with an acrylic polymer not containing phosphate or phosphonate groups. Preferably, the phosphate- or phosphonate-containing monomer units comprise from 0.5% to 8% of the total amount of acrylic polymer(s) on a solids basis, more preferably from 1% to 5%.

The composition of the present invention comprises at least one compound containing a pyrophosphate linkage, i.e., a P—O—P linkage in which each P is part of a phosphate or phosphate ester group. The compound may have some organic functional groups, possibly in the form of alkyl esters, but it contains no more than 12% carbon, preferably no more than 10%, more preferably no more than 8%, more preferably no more than 6%, and most preferably is substantially free of carbon. In a preferred embodiment of the invention, the compound has structure (I)

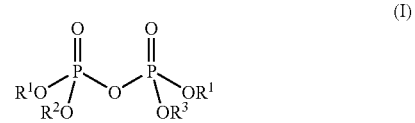

wherein $R^1$ is hydrogen, an alkali metal, or ammonium; $R^2$ and $R^3$ independently are hydrogen, an alkali metal, ammonium, or a group of structure (II)

wherein $R^4$ and $R^5$ independently are hydrogen, an alkali metal, ammonium, or another group of structure (II); wherein $R^4$ and $R^5$ may be different in different groups of structure (II); and wherein pairs of groups selected from $R^2$, $R^3$, $R^4$ and $R^5$ may combine to form one or more cyclic structures. Thus the compound having a pyrophosphate linkage may contain multiple pyrophosphate linkages and may be a branched and/ or cyclic compound. Preferred compounds having a pyrophosphate linkage include, e.g., the acid form, or the alkali metal or ammonium salts of: pyrophosphates, tripolyphosphates, metaphosphates and hexametaphosphates. In a preferred embodiment of the invention, the sodium salts are used. The molar ratio of compound(s) having a pyrophosphate linkage to phosphate or phosphonate functional groups on the acrylic polymer preferably is from 1:0.1 to 1:10, more preferably from 1:0.5 to 1:4, and most preferably from 1:1 to 1:3.

The composition of this invention comprises pigment particles. The composition optionally also contains filler particles. Preferably, the total amount of pigments and fillers as a percentage of total acrylic polymer solids is from 1% to 400%, more preferably from 50% to 200%. Examples of fillers and pigments include, e.g., titanium dioxide, zinc oxide, clay, iron oxide, magnesium silicate, calcium carbonate and combinations thereof. Preferably, the composition of this invention comprises titanium dioxide. Preferably, titanium dioxide particles are orthogonal, i.e., no cross-sectional dimension through a particle is substantially greater than any other cross-sectional dimension through the same particle. Examples of orthogonal particles are spherical and cubic particles, and those having shapes intermediate between spherical and cubic. Preferably, the amount of titanium dioxide as a percentage of total acrylic polymer solids is from 1% to 200%, more preferably from 50% to 150%.

In one embodiment of the invention, the acrylic polymer containing phosphate or phosphonate groups has a $T_g$ from −20° C. to 60° C. Preferably, the $T_g$ is from −15° C. to 35° C., and most preferably from 5° C. to 25° C. $T_g$ is calculated using the Fox equation (T. G. Fox, Bull. Am. Physics Soc., vol. 1 (3), page 123 (1956)). Preferably, the $M_w$ of the acrylic polymer is at least 10,000, more preferably at least 50,000, and most preferably at least 80,000.

When the composition of this invention is formulated as a coating, other conventional coatings adjuvants typically are added, for example, tackifiers, emulsifiers, buffers, neutralizers, thickeners or rheology modifiers, humectants, wetting agents, biocides, plasticizers, antifoaming agents, colorants, waxes, anti-oxidants, and coalescing agents. The solids content of the aqueous coating composition of the invention is from 10% to 70% by volume. The viscosity of the aqueous coating composition is from 50 cps to 10,000 cps, as measured using a Brookfield viscometer. There is a wide range of appropriate viscosity depending on the intended use of the aqueous composition.

The composition of this invention provides improved viscosity stability to latex formulations containing pigments and/or fillers, i.e., it reduces the change in viscosity that occurs upon equilibration or aging. The composition also may have reduced formation of masses of flocculated particles, which tend to settle out of coating compositions.

EXAMPLES

Example 1

Synthesis of Unimodal Polymer Dispersion

A unimodal polymer dispersion was prepared as follows. A 5-liter, four necked round bottom flask was equipped with paddle stirrer, thermometer, nitrogen inlet and condenser. In the initial kettle charge, a mixture of surfactant, ammonium bicarbonate, and deionized water was added to the kettle and heated to 82° C. under a nitrogen atmosphere. A monomer emulsion (ME) was prepared by mixing deionized water, sodium laurylether sulfate, butyl acrylate, methyl methacrylate, 1-dodecanethiol, and phosphoethyl methacrylate (61 weight % active strong acid monomer). With the kettle water at 82° C., the following materials were added in order: ME and rinse water, a mixture of 0.1% iron sulfate solution and 1% ethylenediaminetetraacetic acid, tetrasodium salt solution, a solution of tert-butyl hydroperoxide in deionized water, and a solution of isoascorbic acid in water. The reaction temperature was kept at 80° C. After stirring for 5 minutes, the remaining ME was added over a period of 120 minutes at 80° C. Two cofeed solutions (70% tert-butyl hydroperoxide in deionized water and isoascorbic acid in deionized water) were gradually added. When half of the ME was added to the kettle, ammonium hydroxide (28%) was added to the isoascorbic acid cofeed solution. After the completion of the monomer addition, the ME container was rinsed with deionized water. The dispersion was then cooled 60° C. While the reaction mixture was allowed to continue to cool, two chase solutions (70% tert-butyl hydroperoxide in deionized water and isoascorbic acid in deionized water) were then added over 20 minutes. A 28% ammonium hydroxide solution was added to the kettle, after which the dispersion was filtered to remove any coagulum. The quantities of all materials charged to the kettle can be found in Table 1 below.

TABLE 1

Examples 1-2: Synthesis of Unimodal Polymer Dispersion

| Material Name | Material Amount (g) | |
| --- | --- | --- |
| | Example 1 | Example 2 |
| Initial Kettle Charge | | |
| surfactant* | 96.8 | 9.7 |
| Ammonium bicarbonate | 6.6 | 3.4 |
| Deionized water | 1400 | 950 |
| Monomer Emulsion Preparation | | |
| Deionized water | 680 | 550 |
| surfactant* | 64.5 | 54.8 |
| Butyl acrylate | 940 | 1040 |
| Methyl methacrylate | 996 | 910 |
| 1-Dodecanethiol | 5 | 2.5 |
| Phosphoethyl methacrylate (61 wt % active strong acid monomer) | 64 | 40 |
| Methacrylic Acid | | 10 |

TABLE 1-continued

Examples 1-2: Synthesis of Unimodal Polymer Dispersion

| Material Name | Material Amount (g) | |
|---|---|---|
| | Example 1 | Example 2 |
| Kettle Addition at 82° C. | | |
| Monomer emulsion | 137.5 | 78.2 |
| Rinse water | 20 | 20 |
| Mixture 0.1% iron sulfate solution/1% Ethylenediaminetetraacetic acid, tetrasodium salt solution | 25/1.7 | 18/2 |
| 70% Tert-butyl hydroperoxide in deionized water (TBHP/DIW) | 0.5/10 | |
| Isoascorbic acid in deionized water (IA/DIW) | 0.25/10 | |
| Kettle Addition at 80° C. | | |
| Monomer emulsion | 2616 | 2604 |
| 70% Tert-butyl hydroperoxide in deionized water (TBHP/DIW) | 3.9/99 | 4/104 |
| Isoascorbic acid in deionized water (IA/DIW) | 2.6/90 | 2.8/96 |
| Ammonium hydroxide | 10.9 | 10 |
| Deionized water rinse | 30 | 30 |
| Chase Solutions | | |
| 70% Tert-butyl hydroperoxide in deionized water (TBHP/DIW) | 0.82/10 | 1/15 |
| Isoascorbic acid in deionized water (IA/DIW) | 0.54/15 | 0.72/15 |
| 28% Ammonium hydroxide solution | 18.8 | 20 |
| Filtered dispersion pH | 7.6 | 8.6 |
| Filtered dispersion solids content | 44.7% | 51.2% |
| Filtered dispersion average particle size | 60 nm | 96 nm |

NOTE:
*The surfactant is a 31% solution in water of a mixture of surfactants comprising sodium ethoxylated $C_{10}$-$C_{16}$ alkyl ether sulfates having 3-7 ethylene oxide monomer residues per molecule.

Example 2

Synthesis of Unimodal Aqueous Emulsion Copolymer

A unimodal polymer dispersion was prepared as follows. A 5-liter, four necked round bottom flask was equipped with paddle stirrer, thermometer, nitrogen inlet and condenser. In the initial kettle charge, a mixture of ammonium bicarbonate, the dispersion made in Example 1, and deionized water, was added to the kettle and heated to 80° C. under a nitrogen atmosphere. A monomer emulsion (ME) was prepared by mixing deionized water, surfactant, butyl acrylate, methyl methacrylate, 1-dodecanethiol, and phosphoethyl methacrylate (61 weight % active strong acid monomer). With the kettle water at 82° C., the following materials were added in order: ME and rinse water, and a mixture of 0.1% iron sulfate solution and 1% ethylenediaminetetraacetic acid, tetrasodium salt solution. Two cofeed solutions (70% tert-butyl hydroperoxide in deionized water and isoascorbic acid in deionized water) were gradually added over a period of 130 minutes. Ten minutes after the start of cofeed solutions, the ME was then added over a period of 120 minutes at 80° C. When half of the ME was added to the kettle, ammonium hydroxide (28%) was added to the isoascorbic acid cofeed solution. After the completion of the monomer addition, the ME container was rinsed with deionized water. The dispersion was then cooled to 60° C. While the reaction mixture was allowed to continue to cool, two chase solutions (70% tert-butyl hydroperoxide in deionized water and isoascorbic acid in deionized water) were then added over 20 minutes. A 28% ammonium hydroxide solution was added to the kettle, after which the dispersion was filtered to remove any coagulum. The quantities of all materials charged to the kettle can be found in Table 1 above.

Example 3

One-Pot Synthesis of Bimodal Aqueous Emulsion Copolymer

A bimodal polymer dispersion was prepared as follows. A 5-liter, four necked round bottom flask was equipped with paddle stirrer, thermometer, nitrogen inlet and condenser. A mixture of 29.0 grams of surfactant, 3.4 grams of ammonium bicarbonate, 88.9 grams of an acrylic polymer emulsion (100 nm, 45% solids), and 950 grams of deionized water was added to the kettle and heated to 80° C. under a nitrogen atmosphere. A monomer emulsion (ME) was prepared by mixing 550 grams of deionized water, 64.5 grams of surfactant, 1040 grams of butyl acrylate, 910 grams of methyl methacrylate, 2.5 grams of 1-dodecanethiol, 40 grams of phosphoethyl methacrylate (61 wt % active strong acid monomer), and 10 grams of methacrylic acid. With the kettle water at 80° C, a mixture of 25 grams of 0.1% iron sulfate solution and 1.7 grams of 1% ethylenediaminetetraacetic acid, tetrasodium salt solution was added. The ME was added to the kettle at 80° C. over 2 hours. Two cofeed solutions (4 grams of 70% tert-butyl hydroperoxide in 104 grams of deionized water and 2.8 grams of isoascorbic acid in 96 grams of deionized water) were gradually added along with the monomer emulsion addition. When half of the ME was added to the kettle, ammonium hydroxide (28%, 10 grams) was added to the isoascorbic acid cofeed solution. After the completion of the monomer addition, the ME container was rinsed with 30.0 grams of deionized water. The dispersion was then cooled to 60° C. While the reaction mixture was allowed to continue to cool, two chase solutions (1 grams of 70% tert-butyl hydroperoxide in 15 grams of deionized water and 0.72 grams of isoascorbic acid in 15 grams of deionized water) were then added over 20 minutes. After the addition of a solution of 20 grams of 28% ammonium hydroxide, the dispersion was filtered to remove any coagulum. The filtered dispersion had a pH of 8.6, and 51.6% of solids content. Examination of the dispersion with CHDF showed that it has two distinctive modes (51% at 96 nm and 49% at 242 nm by weight).

Example 4

A 5% tetra sodium pyrophosphate decahydrate solution in water was prepared by dissolving 5 grams of this material in 95 grams of water.

Example 5

On a benchtop stirrer 430 grams of Example 2 was mixed with 43.86 grams of Example 4 which equals 1.0% of tetra sodium pyrophosphate decahydrate on polymer solids (s/s).

Example 6

On a benchtop stirrer 430 grams of Example 3 was mixed with 43.86 grams of Example 4 which equals 1.0% of tetra sodium pyrophosphate decahydrate on polymer solids (s/s).

Example 7

On a benchtop stirrer 307 grams of a Ti-Pure™ R-746 TiO$_2$ slurry was mixed with 43.86 grams of Example 4.

Example 8

Example 5 at 430 grams was added to 307 grams of a Ti-Pure™ R-746 TiO$_2$ slurry. After sitting for a few seconds, they were slowly mixed with a tongue depressor. This mixture was very good with no indication of flocculation or grit formation.

Example 9

Example 2 at 430 grams was added to Example 7 and after sitting for a few seconds was slowly mixed with a tongue depressor. This mixture was very good with no indication of flocculation or grit formation.

Example 10

Example 6 at 430 grams was added to 307 grams of a Ti-Pure™ R-746 TiO$_2$ slurry. After sitting for a few seconds, they were slowly mixed with a tongue depressor. This mixture was very good with no indication of flocculation or grit formation.

Example 11

Example 3 at 430 grams was added to Example 7 and after sitting for a few seconds was slowly mixed with a tongue depressor. This mixture was very good with no indication of flocculation or grit formation.

Example 12

Example 2 at 430 grams was added to 307 grams of a Ti-Pure™ R-746 TiO$_2$ slurry. After sitting for a few seconds, they were slowly mixed with a tongue depressor where flocculation and grit occurs almost immediately.

Example 13

Example 3 at 430 grams was added to 307 grams of a Ti-Pure™ R-746 TiO$_2$ slurry. After sitting for a few seconds, they were slowly mixed with a tongue depressor where flocculation and grit occurs almost immediately.

Examples 14-17

Examples 2, 5, 3 and 6 respectively, which were prepared according to the following formulation (Table 2) and tested for overnight delta KU (Table 3).

Grind: Ti-Pure R-746 TiO$_2$ slurry was placed in a vessel and mechanically stirred on a Premier Mill Corp. laboratory dispersator. While the Ti-Pure R-746 TiO$_2$ slurry was stirring, Triton CF-10, Drewplus L-475, Tamol 1124 and AMP-95 was added to the vessel. In a separate vessel, water, Tamol 1124 and Attagel were mechanically stirred using a benchtop mixer for 10 minutes and then added to the Ti-Pure R-746 TiO$_2$ slurry mix above and stirred for an additional 10 minutes. Letdown: The polymer dispersion was placed in a container on a bench top mixer. This was followed by the addition of the above grind, water, ethylene glycol, Drewplus L-475, Texanol®, Ropaque Ultra, Acrysol® RM-2020 NPR, AcrySol® SCT-275 and additional water.

Examples 18-19

Examples 2 and 3 prepared according the above formulation (Table 2) where Example 7 is used in place of the Ti-Pure R-746 TiO$_2$ slurry.

TABLE 2

| Formulation Ingredients Used in Aqueous Coating Composition | |
|---|---|
| Material Name | Amount (grams) |
| Grind | |
| Ti-Pure R-746 | 307.26 |
| Triton CF-10 | 1.0 |
| Drewplus L-475 | 1.0 |
| Tamol ® 1124 | 4.32 |
| AMP-95 | 0.5 |
| Premix | |
| Water | 45 |
| Tamol ® 1124 | 0.48 |
| Attagel 50 | 5.04 |
| Allow Attagel premix to stir for 10 minutes, and then add to grind and stir for an additional 10 minutes. | |
| LetDown | |
| Latex Polymer (Example 2 or 3) | 430 |
| Water | 150 |
| Add Grind to Latex | |
| Ethylene Glycol | 8.5 |
| Drewplus L-475 | 1.0 |
| Texanol ® | 4.56 |
| Ropaque Ultra | 21.04 |
| Acrysol ® RM-2020 NPR | 25 |
| Acrysol ® SCT-275 | 3 |
| Water | 34.96 |

ACRYSOL and TAMOL are trademarks of Rohm and Haas Company, located in Philadelphia, Pennsylvania. TEXANOL is a trademark of Eastman Chemical Co., located in Kingsport, Tennessee.

TABLE 3

| Example # | Tetra Sodium Pyrophosphate decahydrate level (%) On Polymer Solids | Tetra Sodium Pyrophosphate decahydrate level (%) On TiO$_2$ | KU Initial | KU O/N | ΔKU |
|---|---|---|---|---|---|
| 14 | | | 94 | 113 | 19 |
| 15 | 1.0 | | 94 | 103 | 9 |
| 16 | | | 96 | 113 | 17 |
| 17 | 1.0 | | 94 | 99 | 5 |
| 18 | | 1.0 | 98 | 99 | 1 |
| 19 | | 1.0 | 93 | 101 | 8 |

Examples 15, 17, 18 and 19 show lower delta KU's after equilibrating overnight (O/N) versus Examples 14 and 16 which are without Tetra Sodium Pyrophosphate.

The invention claimed is:

1. An aqueous composition comprising:
   (a) titanium dioxide particles;
   (b) particles of acrylic polymer containing phosphate or phosphonate groups; and
   (c) at least one alkali metal or ammonium pyrophosphate;
   wherein phosphate- or phosphonate-containing monomer units comprise from 1 to 5% by weight of a total amount of the acrylic polymer on a solids basis; and
   wherein a molar ratio of the alkali metal or ammonium pyrophosphate to the phosphate or phosphonate functional groups on the acrylic polymer is from 1:0.5 to 1:4.

2. The composition of claim 1 comprising titanium dioxide particles which are orthogonal.

3. The composition of claim 1 in which the acrylic polymer containing phosphate or phosphonate groups has a $T_g$ from −20° C. to 60° C.

4. The composition of claim 3 in which the acrylic polymer containing phosphate or phosphonate groups comprises residues of phosphoalkyl (meth)acrylate.

5. The composition of claim 4 in which the titanium dioxide particles are orthogonal.

6. The composition of claim 1 in which the acrylic polymer containing phosphate or phosphonate groups comprises residues of phosphoalkyl (meth)acrylate.

7. The composition of claim 6 in which the titanium dioxide particles are orthogonal.

* * * * *